United States Patent [19]

Berstein

[11] 4,313,228
[45] Jan. 26, 1982

[54] WIRELESS LINK BETWEEN VEHICLES AND A STATIONARY INSTALLATION

[75] Inventor: Patrick Berstein, Thornhill, Canada

[73] Assignee: Imperial Oil Limited, Toronto, Canada

[21] Appl. No.: 114,718

[22] Filed: Jan. 23, 1980

[51] Int. Cl.³ .............................................. H04B 9/00
[52] U.S. Cl. ...................... 455/617; 340/616; 340/619; 73/290 R; 137/392
[58] Field of Search ............. 455/600, 617; 383/113; 340/616, 618, 619, 870.16, 870.28, 870.29; 137/386, 392, 393, 389, 551, 588; 73/170 A, 290 R

[56] References Cited

U.S. PATENT DOCUMENTS

| | | | |
|---|---|---|---|
| 2,882,494 | 4/1959 | Webster | 340/532 |
| 3,983,750 | 10/1976 | Kirkland | 73/170 |
| 4,069,838 | 1/1978 | Hansel et al. | 137/392 |
| 4,119,943 | 10/1978 | Harazoe et al. | 340/539 |
| 4,209,767 | 6/1980 | Flanders | 455/617 |

*Primary Examiner*—Robert L. Richardson
*Assistant Examiner*—Edward L. Coles
*Attorney, Agent, or Firm*—Ridout & Maybee

[57] ABSTRACT

A communications link between land vehicles and a stationary vehicle service installation is formed by a modulated optical link between transmitters mounted on the vehicles and receivers at the installation, the radiation and reception patterns of said transmitters and receivers being restricted so that communication is only possible between a particular receiver and the transmitter on a vehicle when that vehicle is within a restricted range of locations. To prevent interference between different receiver/transmitter pairs, the receivers are mounted at a different level from the transmitters, and the transmitters and receivers have asymmetric fields of radiation and reception.

14 Claims, 8 Drawing Figures

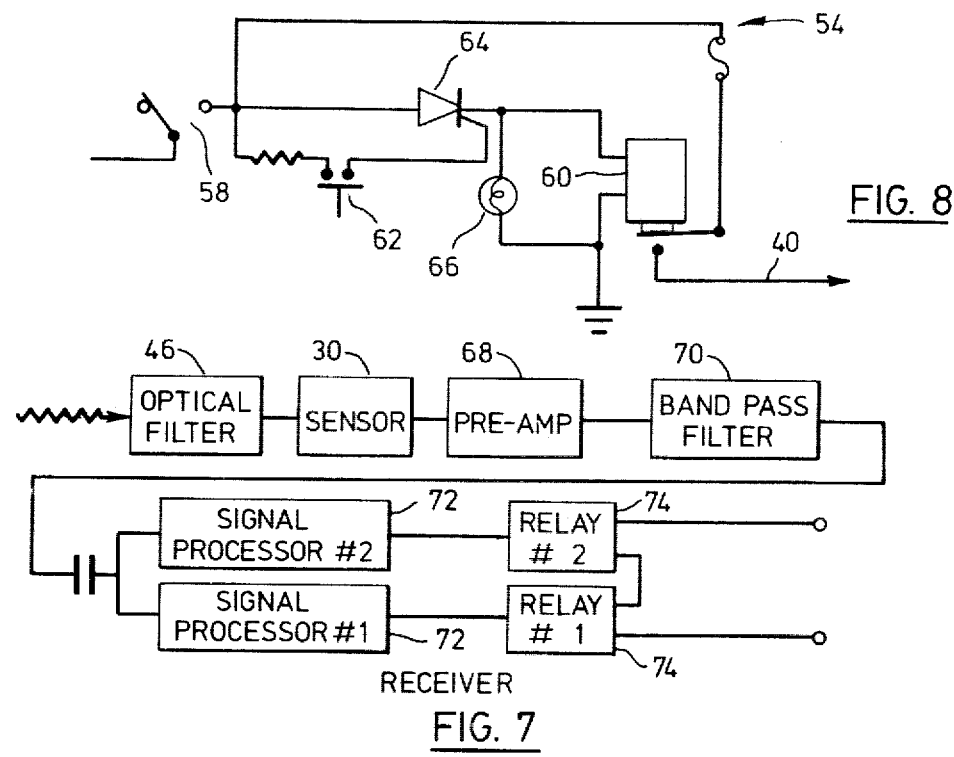
FIG. 8
FIG. 7
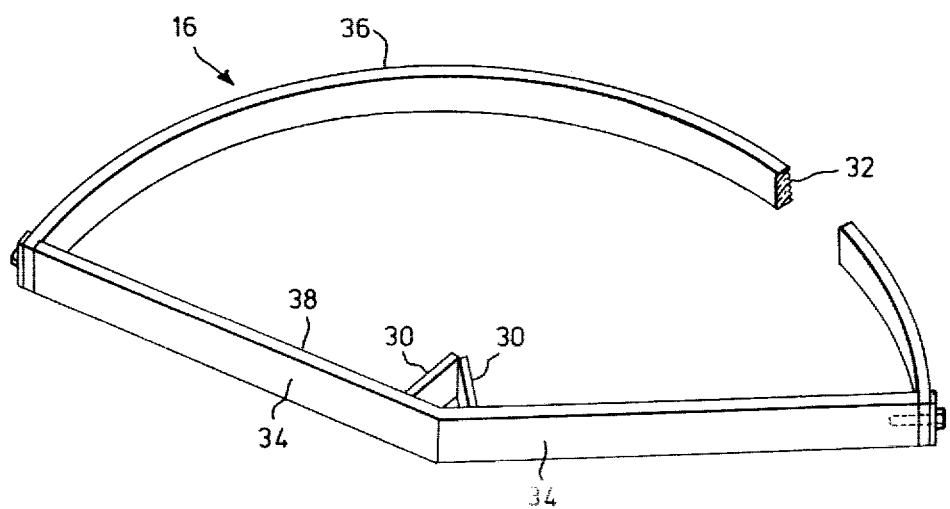
FIG. 5

WIRELESS LINK BETWEEN VEHICLES AND A STATIONARY INSTALLATION

FIELD OF THE INVENTION

This invention relates to communication between vehicles and road side installations, and more particularly though not exclusively to communication between tank vehicles and stationary filling installations for such vehicles.

BACKGROUND OF THE INVENTION

It is well known to provide a tank vehicle with liquid level detectors in the or each tank of the vehicle so as to warn of overfilling during a filling operation. Such detectors are particularly necessary when the liquid being filled is flammable or otherwise hazardous. The detectors are connected to a monitor unit associated with the filling installation which responds to an alarm condition by cutting off the supply of liquid being filled. A number of such detecting systems are known, and the construction of the detectors themselves forms no part of the present invention. The principal shortcoming of known systems resides in the means used to transmit the alarm signals from the vehicle to the stationary installation. This is normally a flexible cable plugged into a receptacle on the vehicle, and it is found that the plug-in connection is a prolific source of problems whilst the cable is subject to considerable wear and tear. Moreover, plugging in the cable is an additional step in the filling operation. Further problems arise from the use of incompatible connectors in different detection systems, and the special precautions needed when establishing electrical connections in the vicinity of highly flammable liquids.

Conventional methods of wireless communication are unsuitable for establishing the link since filling installations are normally arranged to service several vehicles simultaneously at closely spaced locations and it is essential that the monitoring signals transmitted by each vehicle are reliably received at the correct station but at no other station. This problem is difficult to solve by encoding the signals to identify individual vehicles, since any vehicle may be received to fill at any location and thus each receiver would have to be programmed individually for each vehicle scheduled to use its associated filling location. There are strict limits to the extent that the signals can be beamed, since the transmitters on different vehicles during use may be in widely differing locations relative to the receivers, and even if satisfactory control of the beam characteristics could be achieved at an economic price, scattering and reflection of the signal might still cause reception by the wrong receiver.

SUMMARY OF THE INVENTION

We have now found that a satisfactory and reliable communications link may be established between land vehicles and a stationary vehicle service installation in respect of which vehicles are required to assume a restricted range of locations, by means of a particular form of modulated optical link, including an optical transmitter mounted on a vehicle at approximately a first height above grade comprising a modulatable source of submillimetric electromagnetic radiation and means restricting radiation from said source to a comparatively narrow angle in a first dimension and a comparatively wide angle in a second dimension, an optical receiver mounted in a fixed position relative to said stationary installation at a second substantially different height above grade, and comprising a sensor responsive to radiation from said source and on means concentrating said sensor radiation from said source received in a comparatively narrow angle in said first dimension and a comparatively wide angle in said second dimension, said receiver being directed so that its field of view includes all possible locations of a transmitter on a vehicle located anywhere in said range of locations, and said transmitter being oppositely directed relative to the vehicle whereby to establish an optical path between said source and said sensor when the vehicle is anywhere in said range of locations. Preferably the submillimetric electromagnetic radiation is infrared radiation. The term service installation is intended to embrace any installation which a group or class of vehicles may be required to visit at frequent intervals, such as filling installations for tank vehicles, loading bays, inspection stations and the like. A second similar transmitter and receiver pair may be mounted on the service installation and the vehicle respectively to establish two way communication, and information is transmitted by modulation of the source. In the simplest form of the invention, information may be transmitted simply by the presence or absence of modulated light from the source. For example, the transmitter may be arranged so that the source cannot be energized to emit modulated radiation unless overfill sensors on a tank vehicle indicate a non-overflow condition, and the vehicle ignition system is also switched off, and a monitor associated with the receiver may be arranged to prevent the supply of liquid to the tanks of the vehicle unless a modulated signal is received, thus providing a fail-safe system. Additional information, such as data captured by an on-vehicle computer or recorder may also be transmitted, as by frequency shift keying of the modulating frequency. The restricted transmission and reception angles, together with the different heights of the transmitter and receiver and the opposite direction of these units, can readily be selected to prevent any possibility of the wrong signal being received, whilst the modulation of the signal enables substantial elimination of interference from noise in the form of ambient light.

Further features of the invention will become apparent from the following description of preferred embodiments thereof.

IN THE DRAWINGS

FIG. 5 is a plan view of a receiver unit used in the system;

FIG. 7 is a block diagram of a circuit associated with the receiver; and

FIG. 8 is a schematic diagram of the power supply for the transmitter unit.

DESCRIPTION OF THE PREFERRED EMBODIMENT

Figure 1:
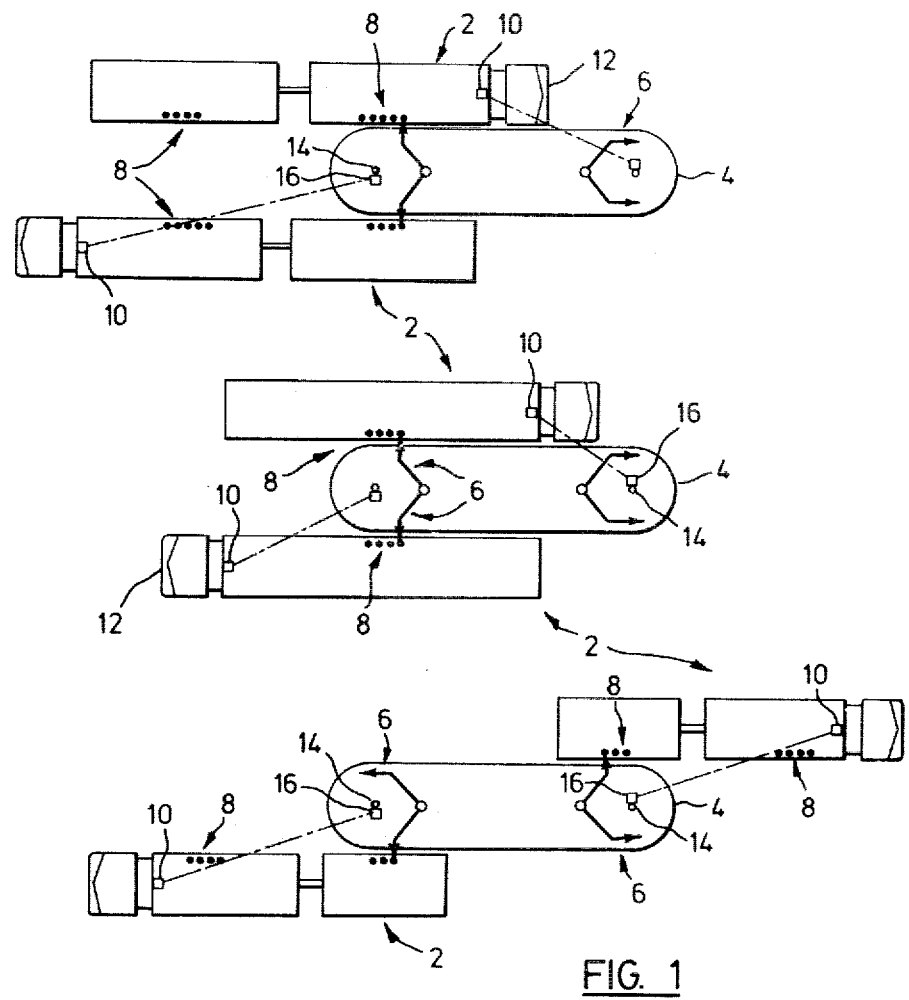
FIG. 1 is a diagrammatic view of a typical tank vehicle filling installation, equipped with the system of the invention.
Figure 2:
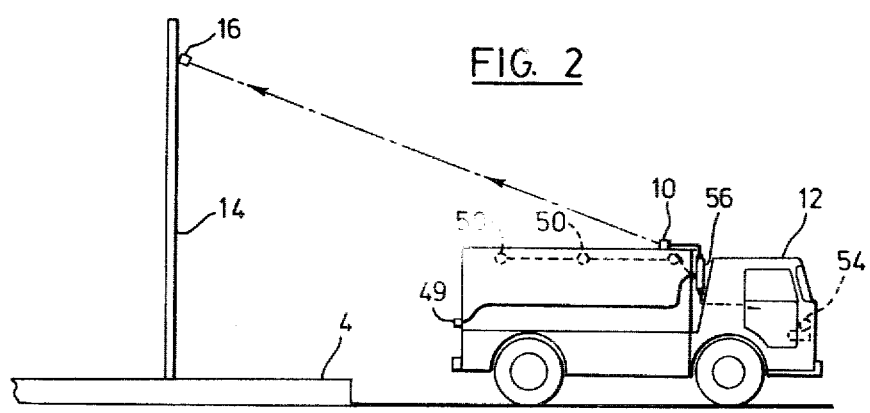
FIG. 2 is a diagrammatic elevation of a vehicle in such an installation.

Referring first to FIGS. 1 and 2, a typical terminal for loading tank vehicles 2 is shown in plan. The terminal has several double sided islands 4 with fuel outlets 6 which can be connected to filler tubes 8 on the vehicles during filling of the latter. The vehicles 2 shown in the figures are illustrative of the range of vehicle types and vehicle positions that can typically occur. Since several vehicles may be in the terminal at one time, it is essential that any wireless signalling link employed to transfer data between a vehicle and an island when the vehicle is standing at the latter should not be subject to inteference from links established between other vehicles and islands or between another vehicle on the other side of the island and the same island.

With this in view, each vehicle is equipped with a directional transmitter unit 10 mounted at an elevated position on the vehicle, typically at the front of the tank immediately behind the vehicle cab 12. As will be described in more detail below, radiation from the transmitter is directed to one side of the vehicle only, typically being restricted in azimuth to about 135° of arc. Usually this will be the same side as the filler tubes 8, i.e., the right hand side in countries which drive on the right of the road. Radiation from the transmitter is also severely restricted so far as its vertical angle is concerned, typically to about 12° of arc, centered on an elevation of about 37° from the horizontal.

Each filling location to either side of each island is provided with a mast 14 on the island carrying a receiver unit 16 at an elevation above grade greater than that of the transmitter units 10 on the trucks, the height of the masts 14 being such that each receiver unit is within the beam from the transmitter unit of a truck at any position within the filling location at which its filler tubes 8 may be coupled to the outlets 6. The angle of reception of the receiver is similarly restricted in azimuth and elevation to the beam from the transmitter, but its reception axis is angled downwardly rather than upwardly, the axis of the receiver and its angles of reception being selected so far as possible so as to receive radiation from anywhere within an area in which the transmitter may be located on a vehicle properly located for filling with its associated filling location, but not from outside that location. Similarly, each transmitter is arranged so that when its associated vehicle is properly located within a filling location, the receiver will fall within its beam. Typically, if the average transmitter height is about 12 feet above grade, then the average receiver height is about 20 feet above grade, with the receiver spaced about 12 feet from the vehicle centre line.

Beam control of radio waves, even at microwave frequencies to the accurancy required by the present invention, requires sophisticated, costly and bulky equipment, and even then the radiation pattern is likely to have lobes in unwanted directions. Similar considerations apply to ultrasound. However, radiation at wavelengths in the submillimetric range is amenable to optical techniques and can be accurately beamed and focussed because the wavelengths involved are very small compared to the physical dimensions of the apparatus. As the wavelength shortens, such radiation becomes more subject to atmospheric absorption and scattering, and optimum results in the present invention are achieved by the use of infra-red radiation. This is less subject to atmospheric absorption and scattering (as by mist, rain or snow) than visible or ultraviolet light, and easily modulated sources of such radiation are readily available at reasonable prices in the form of infra-red emitting diodes. Complementary sensor devices are also readily available. It is of course known to use such devices for the establishment of the line-of-sight communication links, but normally the transmitter diode at least is associated with focussing means to produce a narrow pencil beam, and the transmitter and receiver are carefully aligned to ensure reception of a significant proportion of the energy of the transmitter. I have determined that it is possible to maintain reliable communication over significant distances (50 feet or more) under adverse weather conditions, with the transmitter located anywhere within a substantial area, provided that the source is modulated, the radiation is beamed only into the general area where reception is required, and angle of reception of the receiver is similarly restricted whilst its effective aperture is made large.

Figure 3:
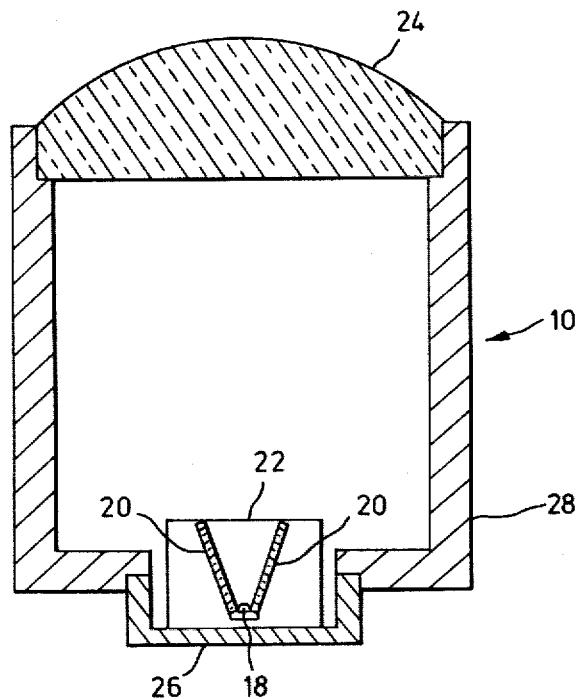
FIGS. 3 and 4 are orthogonal sections through the essential portions of a transmitter unit used in the system.
Figure 4:
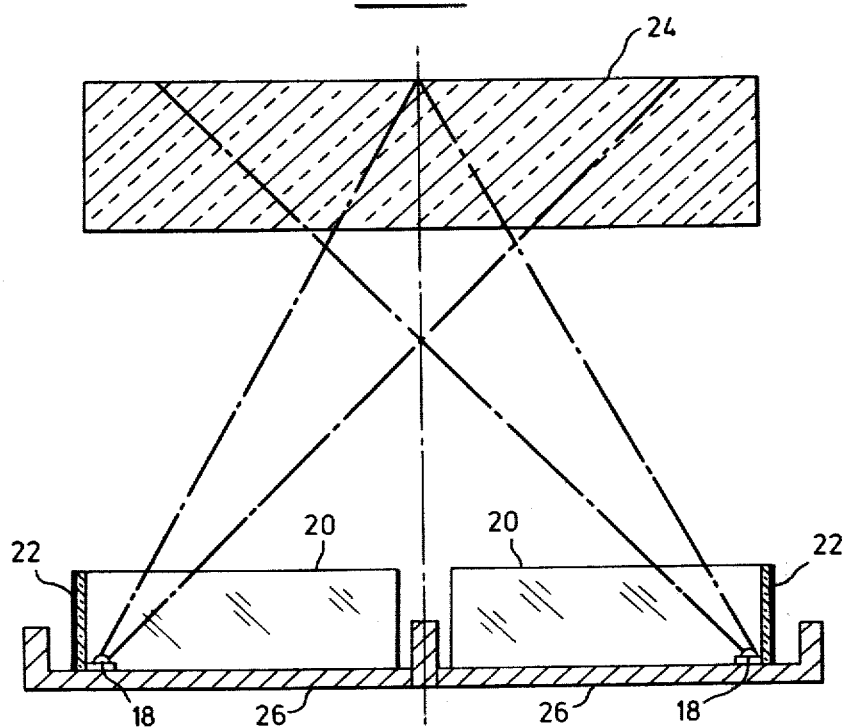

A typical transmitter unit 10 is shown in FIGS. 3 and 4, the case and means for mounting it on the vehicle being omitted for clarity and simplicity. Two infra-red emitting diodes 18 are each mounted in a reflector formed by two inclined mirrors 20 and a vertical mirror 22 which serves to direct most of its radiation onto a cylindrical lens 24, the two reflectors being mounted by bases 26 into a lens holder 28 so that each is optimally located relative to the lens 24, which restricts the vertical angle of radiation to about 12°. Each diode is responsible for one half of the horizontal radiation pattern, the reflector arrangement being such as to increase somewhat the radiation in the angularly outermost portions of the radiation pattern, where the greatest transmitter range is required. Typically, the azimuthal angle of radiation is 135°.

Figure 6:
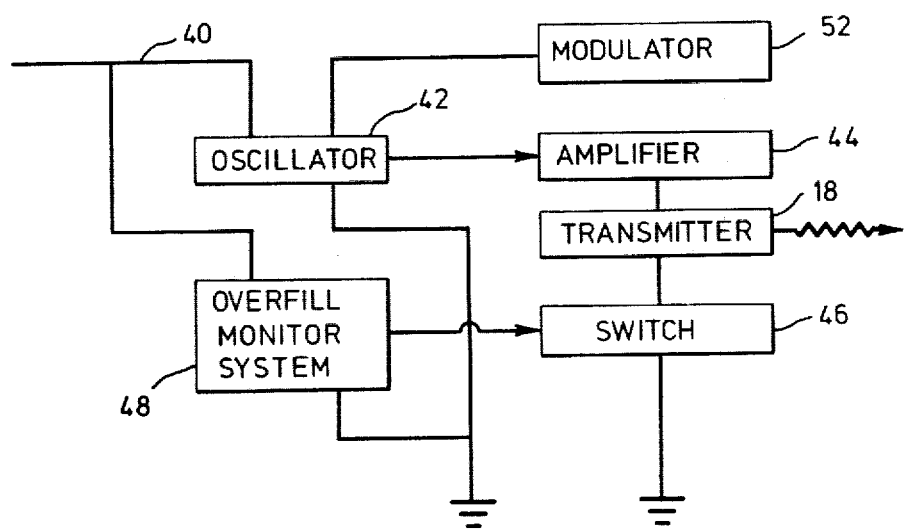
FIG. 6 is a block diagram of a circuit controlling the transmitter.

A receiver unit 16 is shown in FIG. 5, the case again being omitted. Two sensor devices 30 are mounted at the focus of a fresnel lens 32 which subtends on angle at its focus equal to the desired azimuthal reception angle, and is narrow enough to provide the desired elevational reception angle. Efficiency is improved by providing a mirror surface 38 within the angle of a support member 34. By use of a fresnel lens, which may be of a moulded synthetic resin transparent to infra-red radiation, the effective aperture of the receiver may be made very large. The sensor devices are preferably large area devices such as silicon solar cells, so as to pick up as much of the captured radiation as possible, although in some applications infra-red sensitive photodiodes may be preferred because of their more rapid response in spite of their effective efficiency being decreased by their small active area. The receiver incorporates an optical filter 36 typically as part of the lens 32, so as to restrict reception substantially to the wavelengths radiated by the transmitter 10. The characteristics of the transmitter and receiver are chosen so that the radiation from the transmitter incident on the receiver sensors under worst case conditions of maximum range and maximum expected atmospheric absorption will be at least about 10 nanowatts. With the arrangement described, a four inch focus lens employed at the receiver, and a maximum range of 50 feet, this requires a transmitter output of about 10 milliwatts, a figure readily achieved by commercially available light emitting diodes. A circuit for controlling the transmitter is shown in FIG. 6. Power is applied by a line 40 to an oscillator 42 operating typically at about 12 kHz which in turn drives an amplifier 44 providing power to the transmitter diodes 18. The amplifier 44 need be no more than a transistor switch switching drive current to the diode, which current may typically be 100 ma with a 50% duty cycle. The current through the diode is sunk through another electronic switch 46, which is held on by a signal whose presence is to be monitored. Typically the signal to be monitored comes from an overfill monitor 48 which monitors one or more liquid level detectors 50 in the tank or tanks of the vehicle carrying the transmitter. Overfilling of a tank or failure of the monitor causes the signal to disappear and thus the transmitter is switched off. Removal of power on the line 40 has the same effect. As described, the only information transmitted relates to the presence or absence of the signal from monitor 48, but other data of a more complex nature can be transmitted in the presence of the monitor signal, for example by frequency shift keying of the oscillator 42. As will be seen, the oscillator frequency may be allowed to change within a pedetermined bandwidth, thus providing for such keying, for example by a modulator 52. Data transmission by this means is useful for capturing data accummulated for example by an onboard computer on the vehicle as to deliveries on a previous trip. A second transmitter-receiver pair could be used to establish two way communication if desired, with the additional receiver on the vehicle and the transmitter on the mast. In case of malfunction of the transmitter-receiver system, and to allow use of the vehicle at installations without receivers, the monitor 48 also has a conventional outlet receptacle 49.

A typical power supply unit 54 for the monitor 48, and for the transmitter control circuit which is conveniently placed in the same housing 56 as the monitor 48 is shown in FIG. 8. Power from the vehicle battery is applied to the circuit only when the vehicle ignition switch 58 is switched off so that the vehicle cannot be operated. Moreover power is cut off from the line 40 by the normally open contacts of a relay 60. The relay is energized by using a momentary contact switch 62 to fire a thyristor 64 thus completing a circuit through the relay coil and an indicator lamp 66. Any attempt to turn on the ignition will turn off the thristor 64 and thus de-energize the transmitter 10, which cannot then be re-activated except by the switch 62.

The sensors 30 of the receiver 16 provide a signal which is applied to the signal processing circuit shown in FIG. 7. The signal from the sensors is applied to a preamplifier 68 which is matched to the characteristics of the sensors for optimum noise performance and may conveniently be integrated with the sensors in the receivers 16. The preamplified signal is then applied to a band-pass filter 70 and thence to a signal processor 72 including a phase locked loop demodulator in which the upper and lower lock-in limits are appropriately defined. A phase locked loop will not only act as a product detector to provide an output proportional to the amplitude of the modulated signal from the receiver, but can also be used to recover any FSK modulation of the transmitter frequency. The D.C. signal obtained from the phase locked loop is applied to a dual limit comparator which rejects signals above and below predetermined amplitudes, and thence via an output circuit to a normally open relay 74 which controls, for example, a pump or shut-off valve in the supply of liquid to the outlets 6. The action of the comparator results in rejection of signals of strength too low to have come from a properly located transmitter, thus providing additional security against stray radiation from other transmitters in the area. Excessively high level signals are also rejected since they indicate either a malfunction or that the phase-locked loop is out of lock. An integrator between the comparator and the relay provides further protection against spurious signals and signal drop-outs of short duration. The signal processor 72 and relay 74 are duplicated as a precaution against failure.

In use, a vehicle 2 entering a filling location at one side of an island 4 will draw up in a location such that the transmitter 10 is within the field of view of the associated receiver 16 and vice versa. By turning off the vehicle ignition switch 58 and operating the switch 62, the transmitter 10 is activated so as to radiate a 12 kHz modulated signal provided of course that none of the level detectors, as monitored by the monitor 48, indicates an overfill condition. A small portion of the signal is picked up by the appropriate receiver 16, the pick up of extraneous light being reduced by the filter 36. Interference from ambient light is further reduced by the band pass filter 70 and AC coupling to the signal processor 72, which ensures that only signals corresponding to changes in ambient light level at approximately the modulation frequency of the transmitter will be applied to the signal processor. The transmitter signal is detected by the phase-locked loop in the signal processor, and if the latter verifies the presence of a signal of appropriate frequency and amplitude, the relay or relays 74 allow filling to commence, provided that all other safety interlocks, associated for example with the outlets 6, are in proper condition. An overfill condition of any of the tanks will be detected by monitor 48, and this or any other failure of the monitoring system, or any actuation of the ignition switch 58 will result in cessation of the signal fro the transmitter 10, and consequently filling will be interrupted.

Not only the restricted beam dimensions of the transmitter and receiver, but also their different elevations, make for a minimum of scatter from the filling location associated with one transmitter into other filling locations, whilst the amplitude sensitivity of the receivers provides further discrimination. Thus all of the receivers and all of the transmitters may be made identical, providing a very simple and flexible system which nevertheless has the capability of providing a link for more sophisticated data.

Although the system has been described with specific reference to overfill alarm systems for tank vehicles, it will be appreciated that other data could be transmitted from other types of road or rail vehicles which are required to pass through an installation along fairly well defined paths. Thus the system could for example be used to capture data from an on-vehicle tachograph or other recorder at an inspection station. Moreover, whilst in the arrangement described the receiver is to one side of the vehicle path, it could be supported above or at one end of the vehicle path provided that suitable support could be arranged and the geometry of the system was appropriately adjusted. It would also be possible to use more sophisticated optical systems in order better to match the radiation and reception patterns of the transmitters and receivers and increase their efficiency.

What I claim is:

1. A communication link between a land vehicle and a stationary vehicle service installation in respect of which vehicles are required to assume a restricted range of locations, said link including an optical transmitter mounted on the vehicle at approximately a first height above grade and comprising a modulatable source of submillimetric electromagnetic radiation and means restricting radiation from said source to a comparatively narrow angle in a first dimension and a comparatively wide angle in a second dimension, an optical receiver mounted in a fixed position relative to said stationary installation at a second substantially different height above grade and comprising a sensor responsive to radiation from said source and means concentrating on said sensor radiation from said source received in a comparatively narrow angle in said first dimension and a comparatively wide angle in said second dimension, said receiver being directed so that its field of view includes all possible locations of the transmitter on the vehicle when located anywhere in said range of locations, and said transmitter being oppositely directed relative to the vehicle whereby to establish an optical path between said source and said sensor when the vehicle is anywhere in said range of locations.

2. A link according to claim 1, wherein the transmitter comprises at least one emitter of infra-red radiation and the means to restrict the angles of radiation in first and second dimensions comprises an optical system cooperating with said at least one emitter to concentrate the radiation within said angles.

3. A link according to claim 2, wherein each emitter is an infra-red light emitting diode.

4. A link according to claim 2, wherein the receiver comprises an optical system of large effective aperture, an optical filter restricting reception substantially to wavelengths emitted by said at least one emitter, and an infra-red sensor of large effective area.

5. A link according to claim 4, wherein the sensor comprises at least one silicon solar cell.

6. A link according to claim 1, wherein the vehicle is a tank vehicle, and further including a tank overfill monitor on the vehicle, said overfill monitor being operative on detecting an overfill condition to disable said transmitter.

7. A link according to claim 6, including means associated with the vehicle electrical system to prevent enabling of the transmitter unless the vehicle ignition is turned off.

8. A link according to claim 1, including means to modulate said transmitter with a continuous wave carrier frequency, and means for modulating said carrier frequency to permit transmission of additional data.

9. A link according to claim 8, wherein said carrier frequency is modulated by frequency shift keying.

10. A link according to claim 1, wherein the elevation of the transmitter is less than the elevation of the receiver.

11. A link according to claim 10, wherein the receiver is to one side of said restricted range of locations.

12. A modulated optical link between a group of vehicles and a service installation in respect of which land vehicles are required to assume one of a number of spaced restricted ranges of locations, including a modulated optical transmitter mounted on each vehicle at approximately a first height above grade and an optical receiver associated with each of said ranges of locations at a second greater height above grade, each receiver having a downwardly directed field of view restricted substantially to a range of possible positions of a transmitter on a vehicle anywhere in the range of locations associated with said receiver, and each transmitter having a restricted upwardly directed radiation pattern not substantially broader than required to complete an optical link between said transmitter and said receiver with said vehicle anywhere in the range of locations associated with said receiver, said transmitters all transmitting in a common optical waveband and at a common modulation frequency, and said receivers being responsive only to radiation in said waveband and at said modulating frequency.

13. A link according to claim 12, wherein each vehicle includes means to sense a condition on said vehicle, and means to disable the associated transmitter upon sensing of said condition.

14. A link according to claim 13, wherein said condition sensing means senses overfilling of any of one or more liquid containing tanks on the vehicle.

* * * * *